Figure 1:
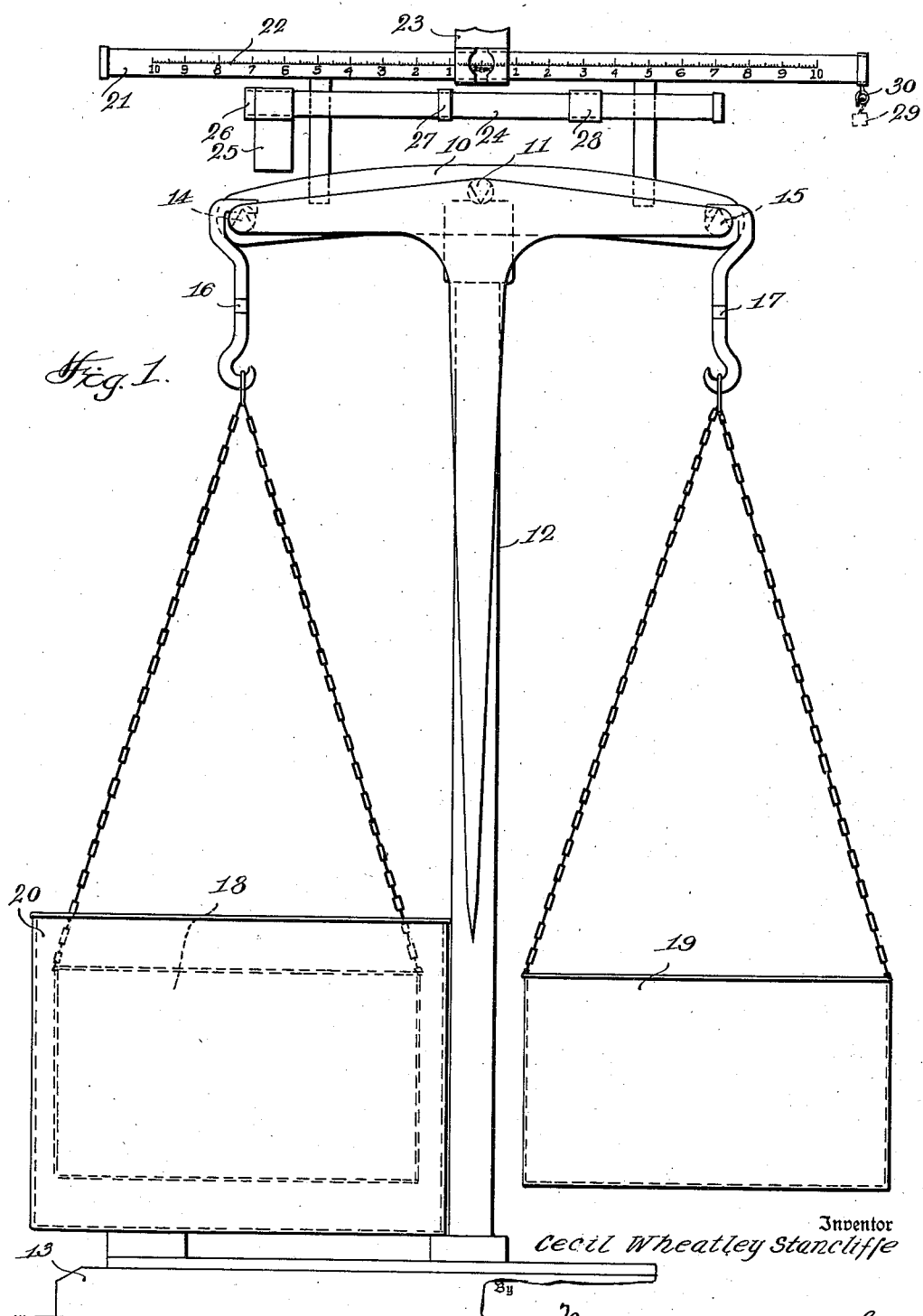

Aug. 4, 1942.   C. W. STANCLIFFE   2,291,771
APPARATUS FOR THE DETERMINATION OF THE MOISTURE
CONTENT OF SAND AND OTHER MATERIALS
Filed May 13, 1939   4 Sheets-Sheet 2

Inventor
Cecil Wheatley Stancliffe
By
Munn, Anderson & Liddy
Attorneys

Aug. 4, 1942.  C. W. STANCLIFFE  2,291,771
APPARATUS FOR THE DETERMINATION OF THE MOISTURE
CONTENT OF SAND AND OTHER MATERIALS
Filed May 13, 1939  4 Sheets-Sheet 4

Inventor
Cecil Wheatley Stancliffe
By Munn, Anderson & Liddy
Attorneys

Patented Aug. 4, 1942

2,291,771

UNITED STATES PATENT OFFICE 2,291,771

APPARATUS FOR THE DETERMINATION OF THE MOISTURE CONTENT OF SAND AND OTHER MATERIALS

Cecil Wheatley Stancliffe, Rochester, Kent, England, assignor of one-half to Winget Limited, Rochester, Kent, England Application May 13, 1939, Serial No. 273,394
In Great Britain May 26, 1938

4 Claims. (Cl. 265—44)

This invention relates to the determination of the moisture content of sand or other materials.

For many purposes, such as in the mixing of concrete, it is desirable to determine the amount of water mixed with a material (such as the sand and the aggregate of a concrete mix).

An object of the present invention is to provide an improved apparatus for this purpose.

More specifically, said object is to provide apparatus for use in determining the moisture content of material (such as sand or aggregate) which does not involve computation by the tester.

In apparatus in accordance with the invention, the moist material is weighed first in air and then in water. Whilst being weighed in water, the material is partially balanced by counterbalance means having a nominal balancing effect equal to that of the sample in air but having an actual balancing effect which is reduced to that of the corresponding weight when immersed in water, of dry material of the same specific gravity as the material being tested. Balance is restored by further counterbalance means which indicate the moisture content of the sample.

Counterbalance means having a balancing effect less than that nominally possessed by them may comprise a mass (or series of masses) marked with a nominal weight and having an actual weight equivalent to the weight in water of this nominal weight of dry material of the same specific gravity as the material to be tested, this mass (or masses) being applied at a fixed distance from the fulcrum of a weighing beam.

Alternatively such counterbalance means may comprise a mass and a scale of which the divisions are such that when the mass is aligned with any division, it counterbalances a mass of dry material of the specific gravity of the material to be tested when immersed in water, the weight in air of this mass of material being that indicated by the division of the scale.

In some cases charts comprising a number of scales each reduced in accordance with one of a range of specific gravities may be arranged on the beam of the weighing apparatus for instance in the form of a rotatable cylinder and the apparatus can then be used to determine the specific gravity of a sample.

Various objects and advantages of the invention will in part become clear and in part be set out in the accompanying description of some specific embodiments which are illustrated in the accompanying drawings, the novel features being pointed out in the appended claims.

Figure 2:
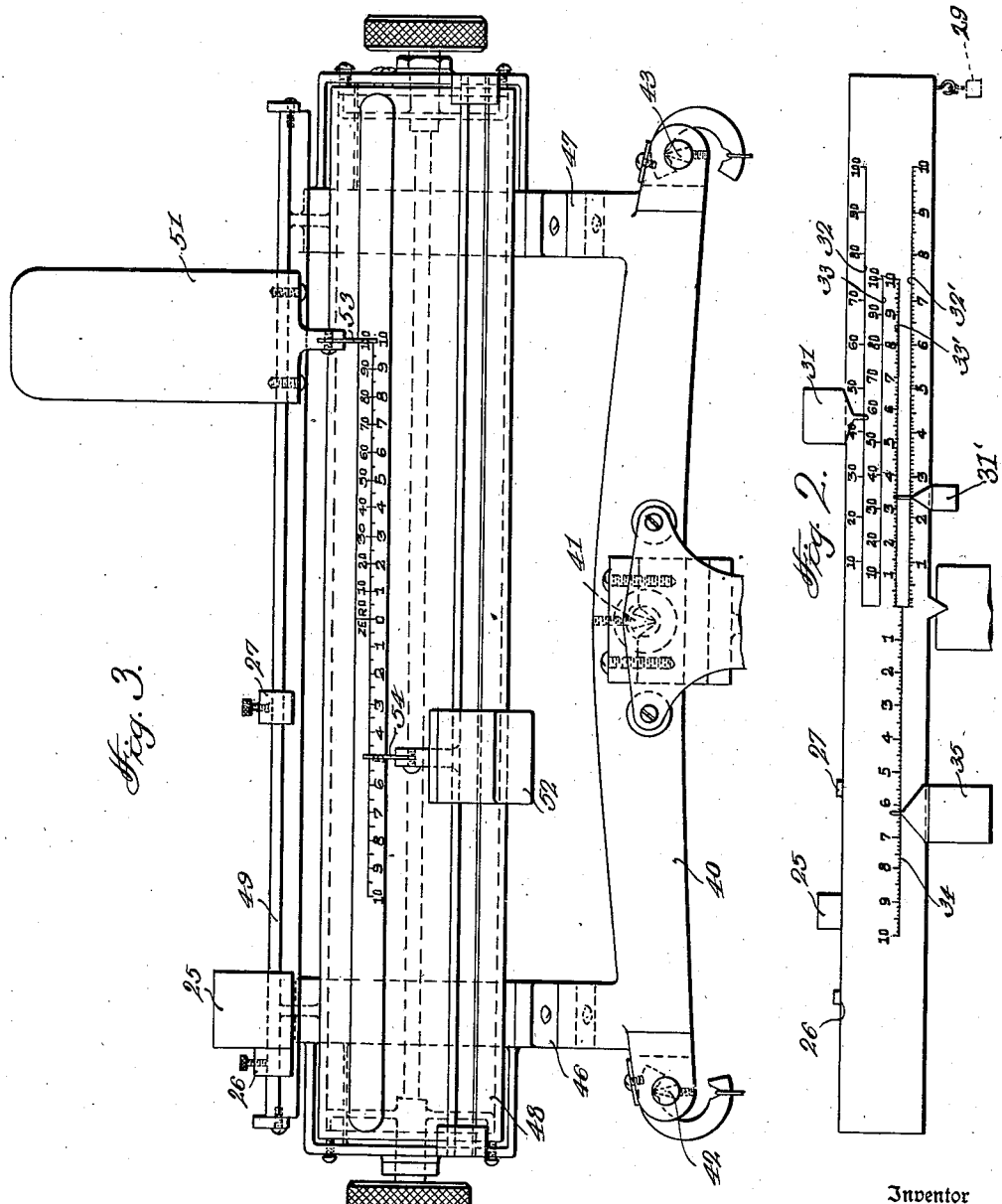
Figure 3:
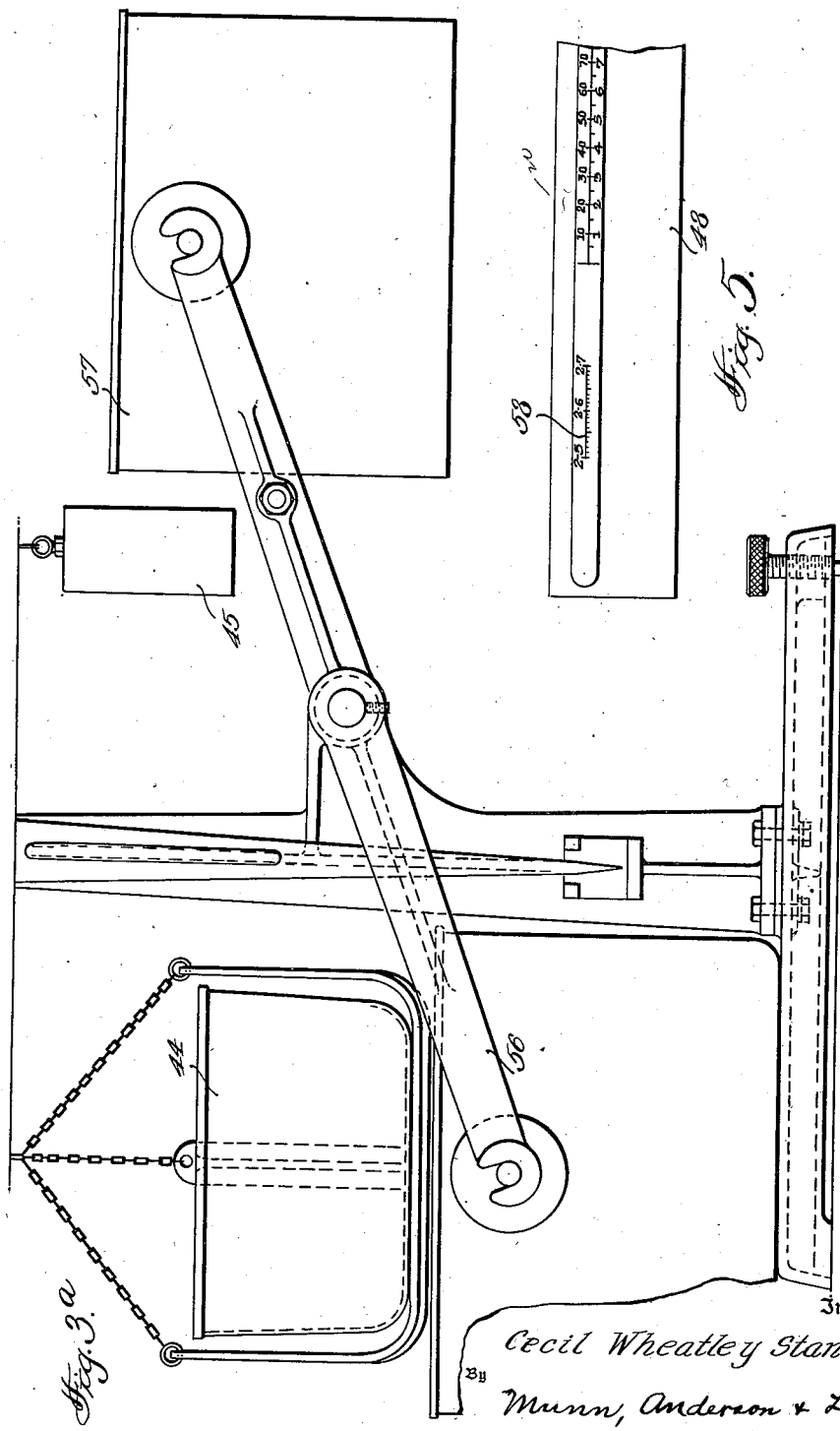
Figure 4:
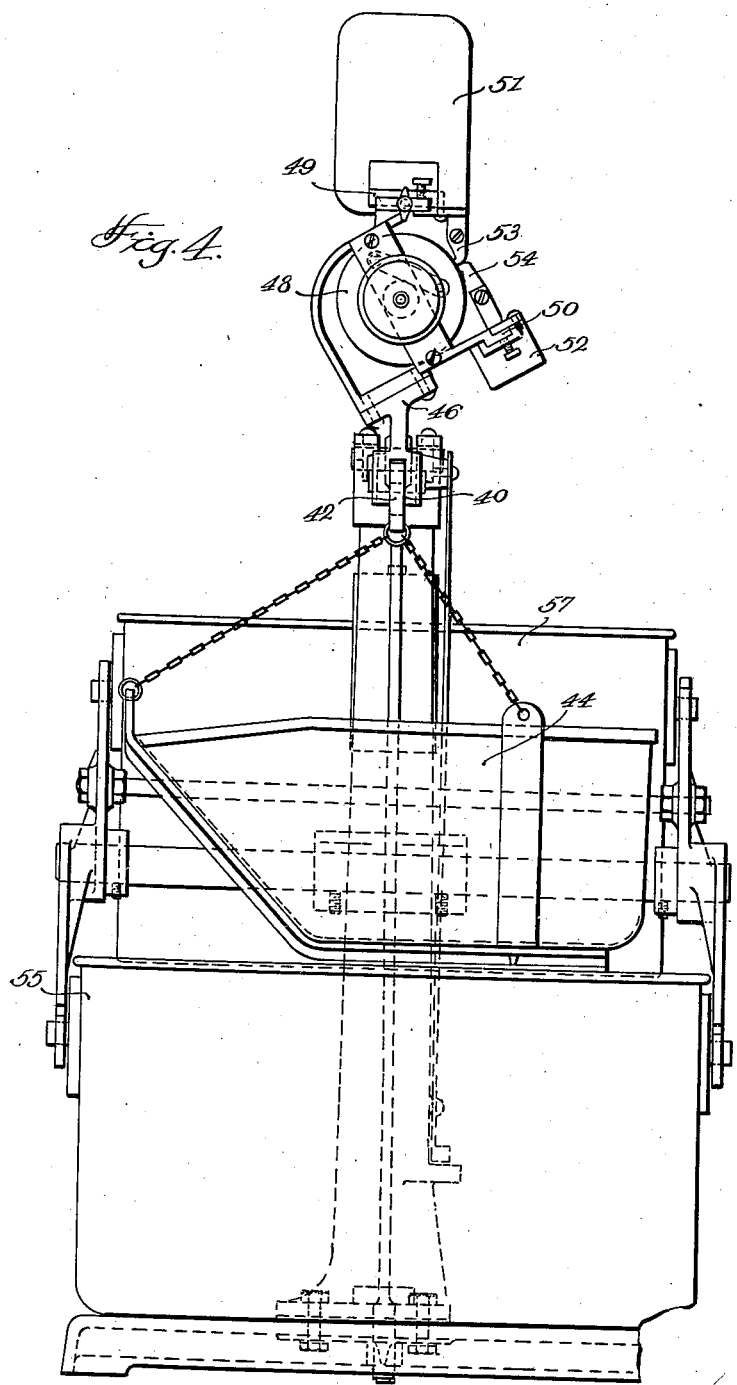

In the drawings:

Fig. 1 represents one form of improved apparatus for determining the moisture content of a material, Fig. 2 represents a modification of a detail of Fig. 1, Figs. 3 and 3a represents yet another form of improved apparatus, Fig. 4 represents a side view of the form shown in Figs. 3 and 3a, and Fig. 5 represents a detail of the form shown in Figs. 3 and 4.

The apparatus shown in Fig. 1 comprises a beam 10 fulcrummed about a knife edge 11 and supported from a pedestal 12 of a stand 13. Knife edges 14, 15 are provided at each end of the beam and stirrups 16, 17 are provided by which containers 18, 19 can be suspended from these knife edges.

Two containers 18, 19 of equal weight and size are provided and a tank 20 is arranged so that one of these containers 18 can be completely immersed in water in the tank.

The beam 10 carries a graduated beam 21 which is marked with a scale 22 indicating the percentage moisture content of a sample. An adjustable weight 23 is movable along this scale.

A compensating beam 24 is fixed to the scale beam and carries a weight 25 movable between two stops 26, 27. In one position against the stop 27 nearest the fulcrum 11, this weight 25 completes the balance of the containers 18, 19 when both are in air and when moved to abut against the other stop 26, this weight 25 compensates for the apparent loss of weight of the container 18 when this is immersed in water. A small adjustable weight 28 is provided on this beam to permit of final balance of the apparatus.

A quantity of the wet substance is placed in the container 18 and a definite known weight, say 100 ozs., is placed on the other container, and the quantity of wet substance is adjusted until it weighs exactly this amount. The weight 23 on the moisture scale 22 is at this stage at the zero position (as shown) and the compensating weight 25 is against the stop 27 nearest the fulcrum.

The wet substance is then immersed in water in the tank 20 whilst still suspended from the scale beam and the compensating weight 25 is moved to its outer position to compensate for the apparent loss of weight of the container.

The weight in the other container 19 is removed and a special weight equal to the weight in water of an equal quantity of the material being tested is placed in the container.

The actual mass of this special weight depends on the specific gravity of the material to be tested and a number of such weights can be provided each corresponding to a particular specific gravity. After the examination of a number of sands, it has been found that for sufficient accuracy in field practice, the specific gravity of sand can be taken as 2.63 and special weights corresponding to this specific gravity are preferably provided.

The scale is restored to balance by moving the adjustable weight 23 along the moisture content scale 22 and the percentage of moisture in the sample is read directly from this scale.

The apparatus may be used for determining the moisture content of newly mixed concrete. In this case, the sample contains aggregate of one specific gravity mixed with a small quantity of cement of a different specific gravity and extreme accuracy is only obtainable by comparison with a dried master sample or by knowledge of the actual dry weights of the materials in the sample. Sufficient accuracy for field practice is obtained by providing a small compensating weight 29 to allow for the specific gravity of the cement in a sample of the usual weight, for example in 100 ozs. of the sample, this weight being chosen to suit average conditions and being suspended, during the weighing in water, from a hook 30 on the beam 21.

The form shown in Fig. 1 may be modified so as to avoid the use of loose weights, one such modification being indicated in Fig. 2. In this form, the sample of wet substance suspended in air is balanced by an adjustable weight 31 movable along a scale 32. Parallel to this scale 32 is a second scale 33, the divisions of which are reduced to an extent corresponding to the specific gravity of the average sand. The adjustable weight 31 when placed opposite a division of this scale 33 will balance substance of the weight indicated when suspended in water.

Preferably, each of these scales for weighing in air and in water respectively are divided into two parts. One part 32, 33 of the scale weighs, say from 0 to 100 ozs. and the other part 32', 33' weighs from 0 to 10 ozs., thus enabling a higher degree of accuracy to be obtained since the 0 to 10 oz. scale can be as long as the 0 to 90 oz. scale. A second weight 31' is used in conjunction with the second part of the scale.

A scale 34 on the other side of the fulcrum is provided with a movable weight 35 the position of which indicates directly the moisture content of the sample. A compensating weight 25 movable between stops 26 and 27 and an adjusting weight 29 to compensate for the cement in a sample of concrete are provided as in the form previously described.

The sample of wet substances is weighed in air, by shifting the balance weights 31, 31' along the beam and reading on the weight in air scales 32, 32'. The sample is then suspended in water, the balance weights 31, 31' are moved to positions indicating on the weight in water scale 33, 33' the weight previously determined and balance is restored by shifting the adjustable weight 35 along the beam. The moisture content is then indicated on the moisture content scale 34.

In another form of the improved apparatus shown in Figs. 3 and 4 a beam 40 is balanced on a knife-edge 41 and carries knife-edges 42, 43 from one of which is suspended a container 44 for the sample and from the other of which is suspended a weight 45 balancing the empty container. Supported from this beam 40 in brackets 46, 47 is a rotatable cylinder 48 with its axis horizontal.

Bars 49, 50 or the equivalent are mounted parallel to the axis of this cylinder 48 and weights 51, 52 are slidable along these bars, each weight carrying a pointer or mark 53, 54 which registers with a scale on the cylinder 48.

The cylinder 48 is marked with a number of scales any one of which can be brought into use by rotating the cylinder until the desired scale is in position to correspond with the adjustable balance weights.

One of these scales is marked in divisions representing weights in air and is used when weighing material in the normal manner. Each of the other scales is marked with divisions reduced to an extent corresponding to materials of a definite specific gravity and the scales cover the range of specific gravities most likely to be encountered. For example, the set of scales may cover a range of specific gravities from 2.5 to 2.75.

Each scale is marked with two sets of indicia one representing say 0 to 100 ounces and the other then representing 0 to 10 ounces and two adjustable weights are used, 51, 52, one for each set of indicia of the scale.

If the specific gravity of the material being tested is known, the sample is weighed in air (using the weight-in-air scale on the cylinder) and the cylinder 48 is then rotated to bring the appropriate specific gravity scale into use. The adjustable weight 51, is moved to the corresponding divisions on this scale and the sample immersed in water. The moisture content is then found by shifting the weight 52 along a moisture determination scale until balance is restored. The apparent loss of weight of the container is allowed for by shifting a weight 25 between stops 26 and 27 as previously described.

If the specific gravity of the material is unknown, a master sample is dried and a definite quantity say 100 ounces is taken. This is suspended in water and the adjustable weight 51 shifted along the beam until balance is restored, the smaller weight 52 being left at the zero position. The cylinder 48 is then rotated until a scale is found on which the apparent weight of the sample is equal to the known weight in air (in the above case, 100 ounces). The specific gravity represented by this scale is then the specific gravity of the material and the moisture content of other samples of the same material can be determined as described above.

The apparatus may be provided with a water container 55 arranged below the scale pan and adapted to be raised to immerse the scale pan and the sample in water. The container may for example be suspended from a lever 56 pivoted to the upright standard of the weighing apparatus and may be counterbalanced, for instance by a similar container 57.

As shown in Fig. 5, the cylinder 48 may be marked with a special scale 58 aligned with the scale representing actual weights in air and this scale 58 may be utilized to determine the specific gravity of a sample. A standard quantity say 100 ozs. of dried material is placed in the container and immersed in water. The weight 51 is moved to a position, indicated on the standard scale by for example a red mark, at which, if the material is of standard specific gravity, the scale beam would be balanced, the weight 25 being at the stop 26 and weight 52 at zero. If, however, the specific gravity of the material differs from this standard specific gravity, the scale beam is restored to balance by moving weight 52 to the specific gravity scale 58, its position relative to this scale when balance is restored indicating the specific gravity of the material. In one form for example, the standard specific gravity is taken as 3.125 and the red mark is then adjacent the 68 ozs. mark on the standard scale.

The apparatus may be used to determine the dry weight of an unknown quantity of wet material. The cylinder 48 is turned to bring into use the scale corresponding to the known (or assumed) specific gravity of the material, and the weight 25 is moved against the stop 26. The material is placed in the container 44 and immersed completely in the tank 55. Balance is obtained by moving the weight 51 (and auxiliary weight 52) along the beam and the dry weight of the material can then be read directly off the scale.

The apparatus may be used in connection with the analysis of concrete by separating the concrete into constituent parts by sieving under water. The dry weights of the constituents may be obtained by weighing them in water and balancing them against the balance weight used in conjunction with a scale relating to the specific gravity (known or estimated) of the material. In this way, drying of the constituent parts of the analysed sample is unnecessary. It is apparent that the actual weight of the mass 23 must be less than its nominal weight, or the scale 22 reduced by the same proportion. In any case this reduction depends on the specific gravity of the material under test. For materials of other specific gravities, the results indicated will be only approximate.

It will be understood that the invention is not restricted to the specific details described but includes such modifications as come within the broad idea underlying the invention.

I claim:

1. Apparatus for use in the determination of the moisture content of a wet material comprising a scale beam, a container in which a sample of the wet material can be suspended from the scale beam, means for counter-balancing the suspended sample and the container in air, means in which the suspended sample and the container are immersible in water, means for counterbalancing the immersed sample comprising the combination of a weight of which the balancing effect is equivalent to that of a mass of dry material of the same specific gravity as the material and of the same weight in air as the sample when this mass of dry material is immersed in water and a second weight of which the balancing effect may be made equal to that of the weight of moisture in the sample, stops on the scale beam, and an adjustable weight movable between said stops to compensate for the difference in the weight of this container in air and in water.

2. Apparatus capable of use in the determination of the moisture content of a wet material comprising a scale beam, means for suspending a sample of the wet material from this scale beam, means for counterbalancing the suspended sample in air, means for immersing the suspended sample in water, means for partially counterbalancing the immersed sample, comprising a weight movable along a scale the divisions of which are reduced so that the counterbalancing effect of the weight at any division is equal to that of a mass of dry material of the same specific gravity as the sample, and of the same weight in air as the sample, as indicated by the division, when immersed in water, and a weight movable along the scale beam to complete the counterbalance relatively to a scale calibrated to indicate the moisture content of the sample.

3. Apparatus capable of use in the determination of the moisture content of a wet material comprising a scale beam, means for suspending a sample of the wet material from this scale beam, means for counterbalancing the suspended sample in air, means for immersing the suspended sample in water, means for partially counterbalancing the immersed sample, comprising a weight movable along the beam, a member carried by the beam and rotatable about an axis parallel to the beam, said rotatable member bearing a plurality of parallel scales, each identified with a predetermined specific gravity, the divisions of each scale being such that when the balancing weight is alined with any division of that scale, it counterbalances a mass of material of the corresponding specific gravity immersed in water, the weight in air of this mass of material being that indicated on the scale, and a weight movable along the scale beam to complete the counterbalance relatively to a scale calibrated to indicate the moisture content of the material.

4. Apparatus for use in the determination of the moisture content of a wet material comprising a scale beam, a container in which a sample of the wet material can be suspended from the scale beam, means for counterbalancing the suspended sample and the container in air, a pivoted lever, a tank for water mounted below said container at one end of the pivoted lever, counterbalance means for said tank at the other end of said lever whereby said tank can be raised to immerse the container, means for counterbalancing the immersed sample, comprising the combination of a weight of which the balancing effect is equivalent to that of a mass of dry material of the same specific gravity as the material and of the same weight in air as the sample when this mass of dry material is immersed in water, and a second weight of which the balancing effect may be made equal to that of the weight of moisture in the sample, stops on the scale beam, and an adjustable weight movable between said stops to compensate for the difference in the weight of this container in air and in water.

CECIL WHEATLEY STANCLIFFE.